Feb. 12, 1929.  P. F. SHIVERS  1,702,061
VARIABLE CONDENSER
Filed Aug. 6, 1923
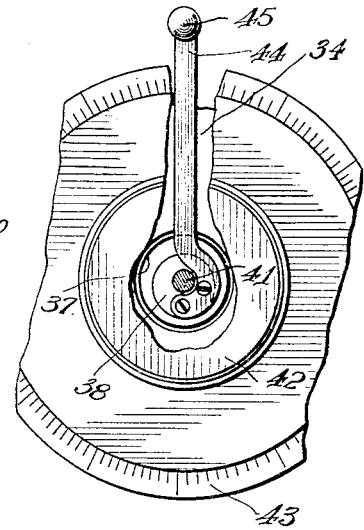
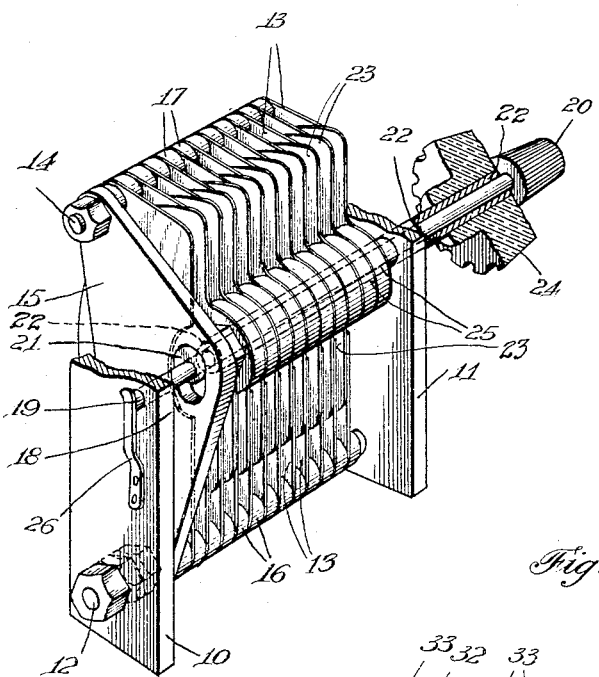
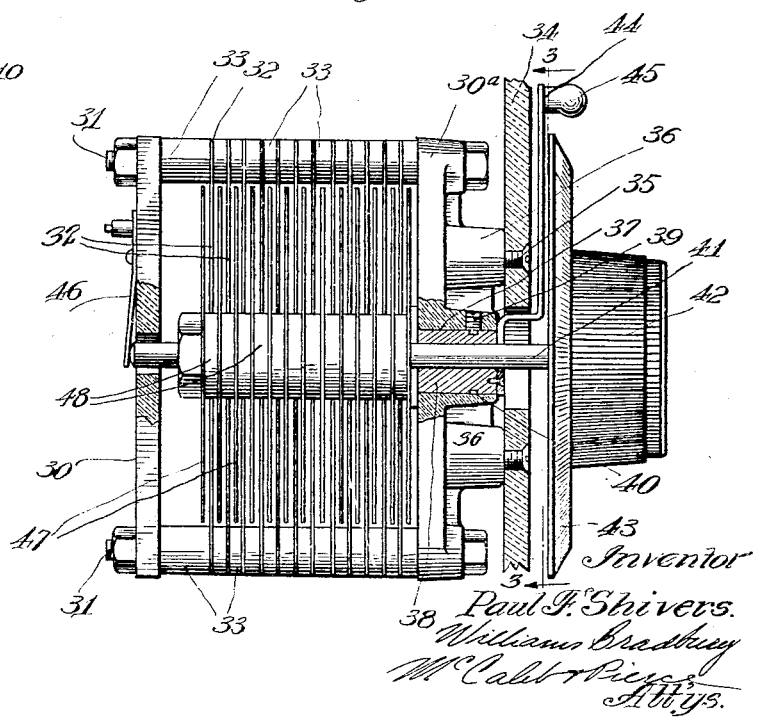

Patented Feb. 12, 1929.

1,702,061

UNITED STATES PATENT OFFICE.

PAUL F. SHIVERS, OF WABASH, INDIANA, ASSIGNOR TO WEBSTER ELECTRIC COMPANY, OF RACINE, WISCONSIN, A CORPORATION OF WISCONSIN.

VARIABLE CONDENSER.

Application filed August 6, 1923. Serial No. 655,818.

My invention relates to variable condensers, and contemplates the provision of a device of this class comprising but two sets of condenser plates, but which is, nevertheless, capable of affording the very fine adjustment of capacity necessary in connection with the circuits of many radio receiving sets. While the condenser of my invention is particularly suitable for radio work, it should be understood that its use is by no means so limited.

Briefly stated, my invention contemplates moving one of two sets of condenser plates around one center to effect the gross adjustment of capacity, and then moving one of said sets around a different center to effect the fine adjustment.

As a detailed description of my invention will best be understood when read in connection with an illustrative drawing, I shall proceed to a description of the accompanying drawing, in which Fig. 1 is a perspective, partly in section, of one embodiment of my invention;

Fig. 2 is a side view, partly in section, of a modified embodiment of the invention, and Fig. 3 is a fragmentary view taken on line 3—3 of Fig. 2.

Referring first to Figure 1, reference characters 10 and 11 indicate supporting plates of insulating material which are connected by a bolt 12. Bolt 12 carries a set of condenser plates 13—13, each of which has its other end apertured to receive a bolt 14.

At 15 is illustrated a plate of insulating material which, similarly to the plates 13—13, has one end journaled upon bolt 12, and is apertured at its other end to receive the bolt 14. Washers 16—16 and 17—17 carried by the bolts 12 and 14, respectively, serve to space the plates 13—13 from plate 15 and from each other. Plate 15 is provided with an elongated aperture 18, the purpose of which will presently appear.

Rotatably supported in plates 10 and 11 is a metal shaft 19 provided with an operating button 20 and having fixed thereto a cam or eccentric collar 21, which occupies the elongated slot 18 of the plate 15. Disposed around shaft 19 is a movable quill shaft 22 which carries a plurality of condenser plates 23—23, which are adapted to be moved into the spaces between plates 13—13 by manipulating button 24 fixed to said quill shaft. Plates 23—23 are clamped between and spaced by a plurality of washers 25—25. If desired, button 24 may be provided with the usual dial, not shown, adapted to co-operate with an index carried by a panel board, or other suitable support, also not shown.

The condenser just described may be included in a circuit by connecting one conductor of the latter with either of the bolts 12 or 14 which are in contact with conductor plates 13—13, and by connecting another conductor with a brush spring 26 which bears against shaft 19, electrical connection between brush 26 and conductor plates 23—23 being afforded through shafts 19 and 20.

In using the condenser, the principal or gross adjustment of capacity is obtained by manipulating button 24 to move the plates 23—23 relatively to the plates 13—13. The latter plates may be considered stationary plates, in so far as the gross adjustment is concerned. A more delicate adjustment is then obtained by manipulating button 20, the cam 21 co-operating with plate 15 to move the latter and the condenser plates 13—13, relatively to plates 23—23, around an axis represented by bolt 12 to vary by extremely small increments the relation between the plates 13—13 and 23—23. In this type of condenser, the plates 23—23 may be regarded as the stationary plates, so far as the fine adjustment is concerned.

In Figs. 2 and 3, I have illustrated a modified embodiment of my invention wherein one set of condenser plates is moved around different axes to accomplish both the gross and fine capacity adjustments. This embodiment of my invention comprises a pair of insulating plates 30 and 30ª connected by metal bolts 31—31 which carry a plurality of fixed condenser plates 32—32 which are held in properly spaced relation by washers 33—33. Plates 32—32 may be of substantially the same shape as the plates 13—13 of the device illustrated in Fig. 1. Supporting plate 30ª is here shown as being mounted upon a panel board or other suitable support 34 by screws 35—35 which co-operate with tapped lugs 36—36 carried by the plate 30ª.

Plate 30ª provides a relatively long bearing 37 for a bearing sleeve or hub 38 which is capable of rotary movement in said bearing 37, but is held against longitudinal displacement by a screw 39 which engages in an annular groove 40 formed in the periphery of said hub or sleeve 38. Journaled in the sleeve or hub 38 and extending eccentrically therethrough is a metal shaft 41 provided with an operating button 42, which may be equipped with the usual dial 43. Dial 43 is here shown as being spaced slightly from the front face of the panel board 34 to accommodate a lever 44 which is provided at one end with an operating handle 45, and has its other end rigidly secured by screws to the bearing sleeve or hub 38, as is most clearly illustrated in Fig. 3. The panel or other support 34 is, of course, suitably apertured to accommodate shaft 41 and lever 44.

It will be noted that shaft 41 has its sole bearing in sleeve or hub 38, the said shaft extending freely through an enlarged aperture in frame plate 30 and being engaged by a brush spring 46 which may constitute one of the terminals of the condenser. Shaft 41 has fixed thereto a plurality of condenser plates 47 which are adapted to be moved in proximity to and in the spaces between the stationary condenser plates 32—32.

Plates 47—47 are conveniently held suitably spaced by washers 48—48. It will be understood that plates 47—47 may be of substantially the same shape as the plates 23—23 of the condenser illustrated in Fig. 1.

The condenser illustrated in Figs. 2 and 3 may be included in a circuit by connecting one of the conductors of the latter with brush spring 46, and by connecting another conductor with either of the bolts 31—31. The principal or gross adjustment of capacity is accomplished by manipulating button 42 to rotate the movable plates 47—47 relatively to the stationary plates 32—32. The more delicate adjustment may then be accomplished by manipulating the lever 44 to shift the axis of the shaft 41, and thereby, by small increments, vary the relation of the movable and stationary condenser plates.

Having thus illustrated and described two practical embodiments of my invention, what I claim is new and desire to secure by Letters Patent of the United States is:

1. A condenser comprising a plurality of sets of elements movable relatively to each other to vary the capacity of said condenser, means for moving the elements of one set relatively to the others around a given axis to effect a gross adjustment, and means for moving the axis of the elements of one group laterally, while maintaining the elements of said group substantially parallel to those of the other group to effect a fine adjustment.

2. A condenser comprising a plurality of fixed elements mounted for rotation adjacent said fixed elements to vary the capacity of said condenser, a shaft for supporting said movable elements and means for moving said shaft in an arc while maintaining said shaft substantially parallel to its initial position.

3. A condenser comprising a plurality of fixed elements mounted for rotation adjacent said fixed elements to vary the capacity of said condenser, a shaft for supporting said movable elements, and a concentric bearing for said shaft for supporting the same and moving said shaft at right angles to its axis to secure a fine adjustment.

4. A condenser comprising sets of elements movable relatively to each other to vary the capacity of said condenser, an actuating element operatively connected to one of said sets to move the same relatively to another set to effect a gross adjustment of capacity, a second actuating element adapted to move one set relatively to another to effect a fine adjustment of capacity and common indicating means carried by one of said actuating elements.

5. A condenser comprising a support, a plurality of fixed elements carried by said support, a shaft, a plurality of movable elements carried by said shaft, an elongated bearing for said shaft, said bearing being eccentrically and rotatably supported on said support, and an actuating lever for said bearing for moving said shaft to various positions parallel to its axis.

6. A condenser comprising a support, a plurality of fixed elements carried by said support, a shaft, a plurality of movable elements carried by said shaft, an elongated bearing for said shaft, said bearing being eccentrically and rotatably supported on said support, an actuating lever for said bearing for moving said shaft to various positions parallel to its axis, and a dial carried by said shaft for indicating adjustment of said condenser with said lever.

In witness whereof, I hereunto subscribe my name this 17 day of July, 1923.

PAUL F. SHIVERS.